(12) United States Patent
Moradi et al.

(10) Patent No.: US 10,853,153 B2
(45) Date of Patent: Dec. 1, 2020

(54) MESSAGE QUEUE PERFORMANCE MONITORING

(71) Applicant: Telefonaktiebolaget LM Ericsson (publ), Stockholm (SE)

(72) Inventors: Farnaz Moradi, Stockholm (SE); Wolfgang John, Haninge (SE); Christofer Flinta, Stockholm (SE); Pontus Sköldström, Kista (SE); Bertrand Pechenot, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/606,174

(22) PCT Filed: Apr. 24, 2017

(86) PCT No.: PCT/SE2017/050402
§ 371 (c)(1),
(2) Date: Oct. 17, 2019

(87) PCT Pub. No.: WO2018/199817
PCT Pub. Date: Nov. 1, 2018

(65) Prior Publication Data
US 2020/0050504 A1      Feb. 13, 2020

(51) Int. Cl.
*G06F 9/54* (2006.01)
*G06F 11/34* (2006.01)
(Continued)

(52) U.S. Cl.
CPC .............. *G06F 9/546* (2013.01); *G06F 9/542* (2013.01); *G06F 11/3409* (2013.01);
(Continued)

(58) Field of Classification Search
None
See application file for complete search history.

(56) References Cited

U.S. PATENT DOCUMENTS

| | | | |
|---|---|---|---|
| 2008/0133337 | A1 | 6/2008 | Fletcher et al. |
| 2016/0269348 | A1 | 9/2016 | Beardsmore et al. |
| 2017/0098162 | A1 | 4/2017 | Ellenbogen et al. |

FOREIGN PATENT DOCUMENTS

CN       103389715 A     11/2013

OTHER PUBLICATIONS

International Search Report and Written Opinion for Application No. PCT/SE2017/050402, dated Feb. 12, 2018, 16 pages.

(Continued)

*Primary Examiner* — Syed A Roni
(74) *Attorney, Agent, or Firm* — NDWE LLP

(57) ABSTRACT

A processor implemented method for monitoring the performance of a message queue for communication between processes is described. The method includes, by an initiating process, publishing a trigger message to a first topic in the message queue, wherein the trigger message identifies one or more performance metrics and at least two processes that communicate via the message queue. The method further includes, by one or more of the at least two processes, retrieving the trigger message from the first topic in the message queue; performing a measurement on one or more messages exchanged between the processes over the message queue, wherein the measurement determines the one or more performance metrics; and publishing the one or more determined performance metrics to a second topic in the message queue. The method also includes, at a receiving process, retrieving the published performance metrics from the second topic in the message queue.

24 Claims, 3 Drawing Sheets

(51) Int. Cl.
    *H04L 12/26* (2006.01)
    *H04L 29/08* (2006.01)
(52) U.S. Cl.
    CPC .............. *H04L 43/08* (2013.01); *H04L 67/36* (2013.01); *G06F 2209/547* (2013.01); *G06F 2209/548* (2013.01)

(56) References Cited

OTHER PUBLICATIONS

Witting, K. et al, "Monitoring Distributed Systems: A Publish/Subscribe Methodology and Architecture," 8th International Symposium on Integrated Network Management, Mar. 24-28, 2003, pp. 89-92.

MESSAGE QUEUE PERFORMANCE MONITORING

CROSS-REFERENCE TO RELATED APPLICATIONS

This application is a National stage of International Application No. PCT/SE2017/050402, filed Apr. 24, 2017, which is hereby incorporated by reference.

TECHNICAL FIELD

The invention relates to message queue performance monitoring.

BACKGROUND

Cloud applications can be implemented with a microservice architecture. In a microservice architecture, applications consist of many small, highly optimized, and independent processes (microservices or microservice applications) that communicate with each other to form complex applications, which provide cloud based services. The individual microservices are controlled by a management system. The microservices have interfaces that enable them to invoke one another to exchange data, e.g. by transmitting and receiving messages, and to perform their respective sets of functions in order to create an overall application.

Microservices can use message queue (MQ) systems for internal application communication. Instead of sending messages directly between individual microservices, each microservice communicates with the MQ. The MQ is responsible for routing, transport, load balancing, publish/subscribe, encryption, etc.

MQs often use a so called publish/subscribe messaging pattern. An MQ will have one or more "topics" to which applications can "subscribe". A sender "publishes" a message to a topic in the MQ, and all subscribers to that topic retrieve the message from the MQ.

A problem for the management system of a cloud application that wants to optimize its network-related functionality is that it does not have any information about the performance of the MQ system. To solve this problem, there are different existing MQ monitoring solutions that are designed specifically for different types of MQ systems: AMon for monitoring the overall health and performance of an ActiveMQ message broker; NATS provide a lightweight monitoring server for obtaining general statistics, info about routes, subscriptions, etc.; Dynatrace™ RabbitMQ monitoring for high-level overview of all RabbitMQ™ components within a cluster.

U.S. Pat. No. 8,907,074 describes a solution for obtaining metrics such as queue lengths from the MQ, by so called self-selected message queue monitoring.

Existing solutions, such as those described above, are mainly designed for monitoring a specific type of MQ system. They require updating or modifying the message system itself, e.g. by adding functionality to the MQ brokers. These solutions only provide metrics about the health of the MQ and high-level statistics about, for example, the number of producers, the number of consumers, the number and size of messages in the queue, routing information and queue sizes.

A management system of an application that wants to troubleshoot or monitor the performance between microservices over a MQ has no access to the MQ performance data. Metrics such as latency between given producers and consumers are not supported.

SUMMARY

According to a first aspect of the present invention there is provided a processor implemented method for monitoring the performance of a message queue for communication between processes. The method comprises, by an initiating process, publishing a trigger message to a first topic in the message queue, wherein the trigger message identifies one or more performance metrics and at least two processes that communicate via the message queue. By one or more of said processes, retrieving the trigger message from the first topic in the message queue; performing a measurement on a message or messages exchanged between the processes over the message queue, wherein the measurement determines the one or more performance metrics; and publishing the one or more determined performance metrics to a second topic in the message queue. The method also comprises, at a receiving process, retrieving the published performance metrics from the second topic in the message queue.

It is an objective of the present invention to provide a generic method to monitor message queue systems, providing producer-to-consumer performance metrics to one or more receivers, such as management/orchestration systems, the message queue, the microservices, and cloud applications. The method is generic in the sense that it is not tailored to a specific message queue system, but may work with many different types of message queue systems.

Each process can be a microservice of an application with a microservice architecture, and the application can be a cloud application. The processes can be controlled by a management system and the initiating process and/or the receiving process may be the management system. The management system may be one of the at least two processes identified by the trigger message.

The steps of retrieving the trigger message, performing a measurement, and publishing the one or more determined performance metrics, can be carried out by an intelligent socket agent of the or each process. The step of performing a measurement may include timestamping the message or messages exchanged between the processes. If at least two processes perform the measurement then each of said processes can publishes a timestamp to the second topic, and the receiving process can calculate the latency by taking the difference in time between the timestamps. Optionally, the trigger message specifies one of active monitoring and passive monitoring.

The one or more performance metrics may comprise at least one of latency, message throughput, and message drop rate. The method may comprise, at the receiving process, analysing the one or more determined performance metrics to produce aggregated results, and publishing the aggregated results to the second topic or a third topic in the message queue. The method may also comprise, by one or more processes and/or at the message queue and/or at one or more management systems, receiving the aggregated results from the message queue.

In certain embodiments of the invention the method comprises storing the determined performance metrics by the or each process that performed the measurement.

The method of the first aspect of the invention, and wherein the processes are controlled by a management system, may comprise, at the management system, creating the first and second topics in the message queue.

According to a second aspect of the invention there is provided a server or a plurality of connected servers. The server(s) comprise one or more processors configured to perform the method of according to the first aspect of the invention.

According to a third aspect of the invention there is provided a system for monitoring the performance of a message queue for communication between processes. The system comprises an initiating process configured to publish a trigger message to a first topic in the message queue. The trigger message identifies one or more performance metrics and at least a first process and a second process that communicate via the message queue. The system also comprises the first and second processes, of which at least one is configured to receive the trigger message from the first topic in the message queue and to perform a measurement on a message or messages exchanged between the first and second processes over the message queue. The measurement determines the one or more performance metrics. The at least one process is configured to publish the one or more determined performance metrics to the second topic in the message queue. The system also comprises a receiving process, which is configured to retrieve the published performance metrics from the second topic in the message queue.

Each process can be a microservice of an application with a microservice architecture, and the application can be a cloud application. The processes can be controlled by a management system and the initiating process and/or the receiving process may be the management system. The management system may be the first process or the second process.

At least one of the first and second processes may comprise an intelligent socket agent, which is configured to receive the trigger message, perform the measurement and publish the one or more determined performance metrics. The receiving process may be configured to analyse the one or more determined performance metrics received from the second topic in the message queue to produce aggregated results, and to publish the aggregated results to the second topic or a third topic in the message queue.

The first process and/or the second process can be configured to store the determined performance metrics.

The processes can be controlled by a management system and the management system may be configured to create the first and second topics in the message queue.

According to another aspect of the invention there is provided a server or a plurality of connected servers, which comprise the system of the third aspect of the invention.

According to another aspect of the invention there is provided a computer program. The computer program comprises instructions which, when executed on at least one processor, cause the at least one processor to carry out the method according to the first aspect of the invention.

According to another aspect of the invention there is provided a carrier containing said computer program. The carrier is one of an electronic signal, an optical signal, a radio signal, or a computer readable storage medium.

DETAILED DESCRIPTION

In order to provide producer-to-consumer performance monitoring of a message queue (MQ) system for communicating between processes (such as microservices) in an application or between applications, it is desirable to have a method that captures performance metrics at the processes. A process is an instance of a computer program that is being executed. A management system or another process requests the monitoring of certain performance metrics for communication between two or more processes over the MQ. The processes are provided with intelligent sockets (intsocs or intsoc agents) which perform measurements for messages exchanged between the processes, and then send the results to the management system. The management system analyses the results and may calculate aggregated results that can be shared with other network entities. The method may be applied to monitor any MQ system, without requiring any updates to the MQ system itself.

The management system is itself a process and may comprise an intsoc agent, in order to perform measurements and publish results. Hence, the management system can be one of the processes identified in the trigger message for which monitoring is requested. In this way, monitoring of the control channel, i.e. monitoring of communication between the management system and other processes, is enabled.

Figure 1:
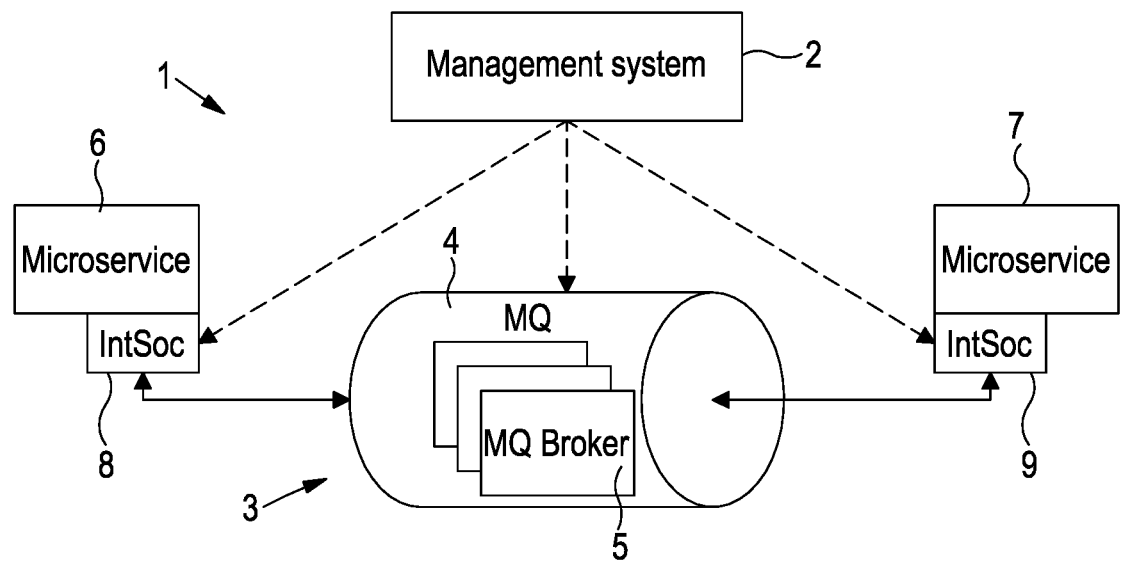
FIG. 1 shows a schematic diagram of a microservice architecture.

FIG. 1 shows a microservice architecture 1 in accordance with an embodiment of the disclosure. The application includes a management system 2, a MQ system 3 with a MQ 4 and a MQ broker 5, two microservices 6, 7 with respective intelligent sockets 8, 9. The two microservices 6, 7 communicate with each other using the message queue system 3. Each microservice application 6, 7 uses an intelligent socket (intsoc) 8, 9 to connect to the MQ system 3. The intsocs 8, 9 receive monitoring triggers, perform measurements, and publish the results to the MQ system 4. The management system 2 is itself a client of the MQ system 3, which publishes measurement triggers, receives measurement results, and can also publish aggregated results to the MQ system 3.

In an embodiment of the disclosure two microservices, A and B respectively, form a part of a cloud application. The application also comprises a management system and a message queue (MQ) with a MQ broker. Alternatively, the management system and MQ are services provided by a platform on which the application is run, and are not part of the application itself. The management system creates and publishes two topics to the MQ: 'triggers' and 'results'. The MQ broker routes messages in a specific topic to all subscribers of that topic. The management system subscribes to the 'results' topic, such that any messages published to this topic are sent to and received by the management system. The microservices of the application (including A and B) subscribe to the 'triggers' topic. The management system obtains information regarding all microservices in the application, including their identities and their subscriptions, so that it can request performance monitoring of the MQ for messages sent between specific microservices. The management system publishes a trigger message to the 'triggers' topic in the MQ. The message contains the identities A and B of two microservices, and the performance metric 'latency' to be captured. Since A and B subscribe to the 'triggers' topic they retrieve the trigger message from the MQ. Other microservices that have also subscribed to the 'results' topic, for example C and D, will also retrieve the trigger message, but will not take any action as they are not identified in the trigger message.

A and B will, after parsing the trigger message, capture the performance metric specified in the trigger message. In this case the performance metric is 'latency'. The measurement process can include the following steps: A message sent from microservice A to microservice B is intercepted by the intsoc of A before being published to the MQ. The intsoc of A timestamps the message and sends it to the MQ. The MQ routes the message as normal and sends it towards B. The intelligent socket of B intercepts the message and timestamps it. The intelligent socket of B takes the difference in time between the two timestamps in the message, and publishes it in a new message to the 'results' topic in the MQ. Alternatively, both A and B publish their respective timestamps to the 'results' topic, which can then be used by the management system to calculate the latency.

The management system, which subscribes to the 'results' topic, retrieves the results message. A message sent from B towards A is similarly handled so that the latency of a message from B to A, as well as from A to B, is published to the 'results' topic and received by the management system. The management system may analyse and aggregate multiple results, and may share results with other network entities (e.g. microservices, the MQ system and other management systems). The management system can publish a message with aggregated results to the 'results' topic in the MQ, so that all subscribers of that topic receive them.

The management system can also create another topic in the MQ, specifically for sharing the aggregated results with other network entities. Any other network entity may receive the aggregated results by subscribing to this 'aggregated results' topic. Aggregated results, in this sense, may be produced by analysing and processing a single results message, in order to put the results into a different form.

In an alternative embodiment, instead of intercepting and timestamping messages sent between the microservices as part of their normal operation within the application, i.e. passive monitoring, the trigger message published by the management system may specify 'active monitoring' of microservices A and B. After retrieving and parsing the trigger message, microservices A and B will create test messages to be sent between them in order to capture the performance metric specified in the trigger message. Microservice A creates a new test message to B, timestamps it, and publishes it to the MQ. The MQ routes the test message to B. B retrieves the test message, timestamps it, and publishes a new message with the captured performance metric to the 'results' topic in the MQ. Similarly B creates a test message to A, timestamps it, and publishes it to the MQ. The MQ routes the test message to A. A retrieves the test message, timestamps it, and publishes the captured performance metric to the 'results' topic in the MQ. The management system retrieves the two result messages from the MQ, and may analyse them and provide aggregated results to other network entities. As previously described, the timestamping and measuring steps are carried out by the respective intsocs of A and B.

Figure 2:
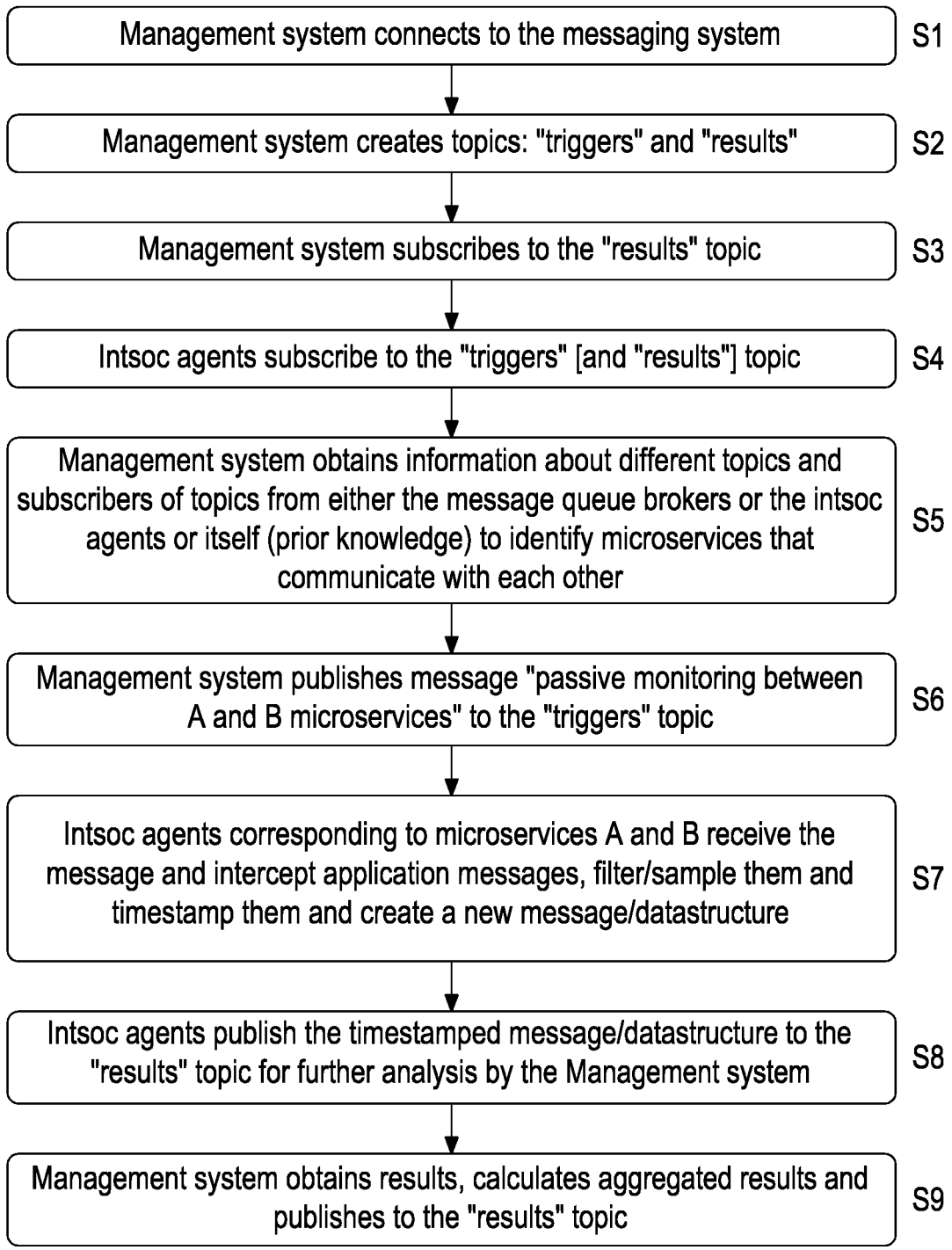
FIG. 2 is a flow chart of an embodiment of the invention using passive monitoring.

FIG. 2 illustrates a method of passive monitoring according to an embodiment of the invention. The management system connects to the messaging system S1. The management system creates the topics 'triggers' and 'results' S2, and then subscribes to the 'results' topic S3. The intsoc agents of the microservices subscribe to the 'triggers' topic S4. The management system obtains information about different topics and subscribers of topics from either the message queue brokers of the messaging system, the intsoc agents of the microservices or from itself, in order to identify microservices that communicate with each other S5. Then the management system publishes a message containing "passive monitoring between A and B microservices" to the 'triggers' topic S6. Intsoc agents corresponding to microservices A and B receive the message and intercept application messages, filter/sample and timestamp them, and create a new message S7. The intsoc agents publish a new message including timestamping information or other measurement results to the 'results' topic for further analysis by the management system S8. Optionally, the management system obtains the results, calculates aggregated results and publishes them to the 'results' topic S9.

Figure 3:
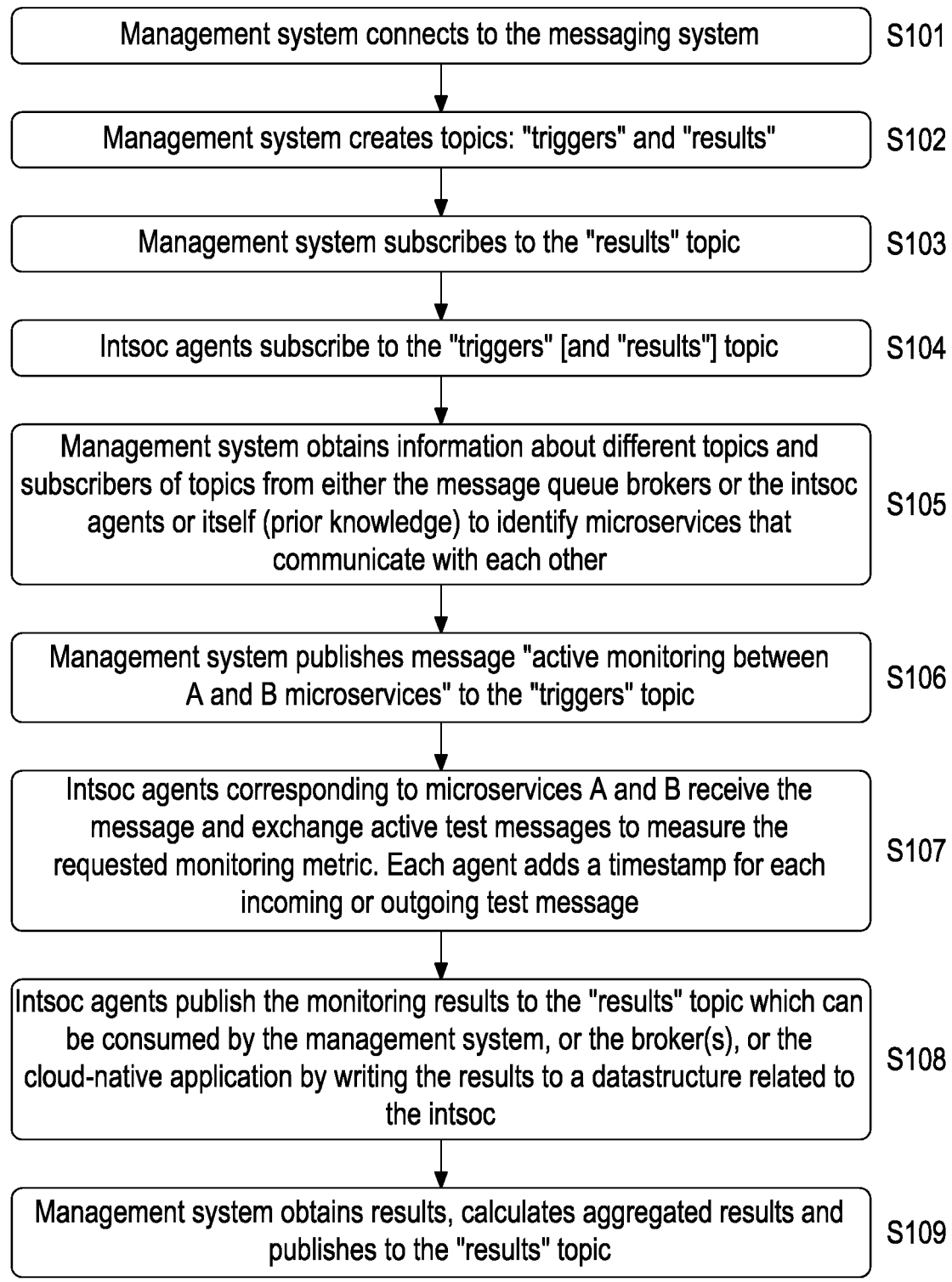
FIG. 3 is a flow chart of an embodiment of the invention using active monitoring.

FIG. 3 illustrates a method of active monitoring according to an embodiment of the invention. The first five steps (S101 to S105) are the same as the first five steps in FIG. 2, outlined above. After obtaining information about topics and subscribers of topics S105, the management system publishes a message containing "active monitoring between A and B microservices" to the 'triggers' topic S106. The intsoc agents of A and B receive the message and exchange active test messages to measure the requested monitoring metric S107. Each agent adds a timestamp for each incoming and outgoing test message S107. The intsoc agents publish the monitoring results to the 'results' topic which can be consumed by the management system, or the broker(s), or the cloud-native application by writing the results to a data-structure related to the intsoc S108. Optionally, the management system obtains the results, calculates aggregated results and publishes them to the 'results' topic S109.

The microservices can subscribe to the 'results' topic in the MQ S4, S104. For example, there may be individual microservices with functionality that can use the captured performance metrics, such as latency, to optimise network communication and application performance.

The disclosed method for performance monitoring of a MQ can be implemented by a system containing a management system 2 and at least two processes 6, 7 connected to each other by the MQ 4. The management system 2 is configured to request performance monitoring by publishing a trigger message to a 'triggers' topic in the MQ 4. Each process 6, 7 is configured to retrieve the trigger message from the 'triggers' topic in the MQ 4. The trigger message contains one or more performance metrics as well as the identities of the two connected processes 6, 7 which are to capture said performance metrics. The identified processes 6, 7 are configured to perform a measurement for a message or messages exchanged between them in order to capture the performance metrics. The processes 6, 7 are further configured to publish a message containing the results of the measurement to a 'results' topic in the message queue 4. The management system 2 is configured to retrieve the message with the results from the 'results' topic.

It will be appreciated by the person of skill in the art that various modifications may be made to the above described embodiments without departing from the scope of the invention. For example, only one of two processes specified in the trigger message may perform the measurement and publish the results to the MQ. Also, although in the above described embodiments only the management system requests performance monitoring, in other embodiments any process in the network may request performance monitoring by publishing a trigger message to the MQ.

The invention claimed is:

1. A processor implemented method for monitoring performance of a message queue for communication between processes, the method comprising:
by an initiating process, publishing a trigger message to a first topic in the message queue, wherein the trigger message identifies one or more performance metrics and at least two processes that communicate via the message queue;
by one or more of the at least two processes:
retrieving the trigger message from the first topic in the message queue;
performing a measurement on one or more messages exchanged between the processes over the message queue, wherein the measurement determines the one or more performance metrics;
publishing the one or more determined performance metrics to a second topic in the message queue; and
at a receiving process, retrieving the published performance metrics from the second topic in the message queue.

2. The method according to claim 1, wherein each process is a microservice of an application with a microservice architecture.

3. The method according to claim 2, wherein the application is a cloud application.

4. The method according to claim 1, wherein the processes are controlled by a management system and at least one of the initiating process and the receiving process is the management system.

5. The method according to claim 1, wherein the processes are controlled by a management system and the management system is one of the at least two processes identified by the trigger message.

6. The method according to claim 1, wherein retrieving the trigger message, performing the measurement, and publishing the one or more determined performance metrics, are carried out by an intelligent socket agent of the one or more of the at least two processes.

7. The method according to claim 1, wherein the performing the measurement includes timestamping the one or more messages exchanged between the processes.

8. The method according to claim 7, wherein at least two processes perform the measurement and each of the at least two processes publishes a timestamp to the second topic, and the receiving process calculates a latency by taking the difference in time between the timestamps.

9. The method according to claim 1, wherein the trigger message specifies one of active monitoring and passive monitoring.

10. The method according to claim 1, wherein the one or more determined performance metrics comprise at least one of latency, message throughput, and message drop rate.

11. The method according to claim 1, further comprising at the receiving process, analyzing the one or more determined performance metrics to produce aggregated results, and publishing the aggregated results to the second topic or a third topic in the message queue.

12. The method according to claim 11, further comprising by one or more processes, at the message queue, and/or at one or more management systems, receiving the aggregated results from the message queue.

13. The method according to claim 1, further comprising storing the determined performance metrics by each process that performed the measurement.

14. The method according to claim 1, wherein the processes are controlled by a management system, and the method further comprising, at the management system, creating the first and second topics in the message queue.

15. A system for monitoring performance of a message queue for communication between processes, the system comprising a processor with machine readable instructions that causes the system to perform:
an initiating process configured to publish a trigger message to a first topic in the message queue, wherein the trigger message identifies one or more performance metrics and at least a first process and a second process that communicate via the message queue;
first and second processes, of which at least one is configured to receive the trigger message from the first topic in the message queue, perform a measurement on one or more messages exchanged between the first and second processes over the message queue, wherein the measurement determines the one or more performance metrics, and publish the one or more determined performance metrics to the second topic in the message queue; and
a receiving process configured to retrieve the published performance metrics from the second topic in the message queue.

16. The system according to claim 15, wherein each process is a microservice of an application with a microservice architecture.

17. The system according to claim 16, wherein the application is a cloud application.

18. The system according to claim 15, wherein the first and second processes are controlled by a management system and at least one of the initiating process and the receiving process is the management system.

19. The system according to claim 15, wherein the processes are controlled by a management system and the management system is the first process or the second process.

20. The system according to claim 15, wherein at least one of the first and second processes comprises an intelligent socket agent configured to receive the trigger message, perform the measurement, and publish the one or more determined performance metrics.

21. The system according to claim 15, wherein the receiving process is configured to analyze the one or more determined performance metrics received from the second topic in the message queue to produce aggregated results and to publish the aggregated results to the second topic or a third topic in the message queue.

22. The system according to claim 15, wherein one or more of the first process and the second process is configured to store the determined performance metrics.

23. The system according to claim 15, wherein the processes are controlled by a management system and the management system is configured to create the first and second topics in the message queue.

24. A non-transitory machine-readable storage medium that provides instructions that, if executed by a processor, will cause said processor to perform operations for monitoring performance of a message queue for communication between processes, wherein the operations comprise:
by an initiating process, publishing a trigger message to a first topic in the message queue, wherein the trigger message identifies one or more performance metrics and at least two processes that communicate via the message queue;
by one or more of the at least two processes:
retrieving the trigger message from the first topic in the message queue;

performing a measurement on one or more messages exchanged between the processes over the message queue, wherein the measurement determines the one or more performance metrics;
publishing the one or more determined performance metrics to a second topic in the message queue; and
at a receiving process, retrieving the published performance metrics from the second topic in the message queue.

\* \* \* \* \*